US008715060B2

(12) United States Patent
Bowron

(10) Patent No.: US 8,715,060 B2
(45) Date of Patent: May 6, 2014

(54) SECONDARY GAME TRIGGERING TECHNIQUE FOR BONUS GAME

(71) Applicant: Spielo International Canada ULC, Moncton (CA)

(72) Inventor: Edward Bowron, Shediac Bridge (CA)

(73) Assignee: Spielo International Canada ULC, Moneton, NB (CA)

( * ) Notice: Subject to any disclaimer, the term of this patent is extended or adjusted under 35 U.S.C. 154(b) by 101 days.

(21) Appl. No.: 13/622,267

(22) Filed: Sep. 18, 2012

(65) Prior Publication Data

US 2014/0080569 A1 Mar. 20, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.
USPC ........... 463/20; 463/1; 463/9; 463/23; 463/25

(58) Field of Classification Search
USPC ............................................ 463/9, 20, 23, 25
See application file for complete search history.

*Primary Examiner* — Adetokunbo O Torimiro
(74) *Attorney, Agent, or Firm* — Patent Law Group LLP; Brian D Ogonowsky

(57) ABSTRACT

A secondary game is played continuously over a series of reel-type main games on a video gaming device, where the successful outcome of the secondary game is the initiation of a bonus game. Therefore, the player is enticed to keep playing due to the player's investment in the secondary game and the expectation of playing the bonus game. At the beginning of a playing session, a visual indicator, such as a colored tile, is located at each of the symbol positions. The virtual reels are then spun and randomly stopped to display random symbols. If there is a winning combination of symbols, such as three of a kind, the indicators at those symbol positions are changed, such as being extinguished. The player keeps playing the main games until there are no more indicators. When all indicators are extinguished, a bonus game is initiated.

26 Claims, 6 Drawing Sheets

BONUS GAME TRIGGERED

SECONDARY GAME TRIGGERING TECHNIQUE FOR BONUS GAME

FIELD OF THE INVENTION

This invention relates to gaming devices, such as slot machines or on-line gaming computers and, in particular, to a technique for determining when to initiate a bonus game.

BACKGROUND

Common gaming machines randomly select and display an array of symbols on a video screen, then grant an award to a player based on the occurrence of winning symbol combinations across pay lines. Typically, the game ends after the symbols are displayed and the award, if any, is granted. Some gaming programs initiate a bonus game for a special outcome of the main game to add more excitement to the gaming experience. The bonus game typically awards more to the player, on average, than a main game so is very exciting. Triggering such bonus games with a special outcome of the main game does not entice the player into playing longer since the chances of obtaining the special outcome is always the same.

There are also known techniques for enticing the player to play longer, such as a secondary game that is played over the course of many main games so the player becomes invested in the secondary game. Winning the secondary game may result in a relatively large award. The secondary game is then reset. The secondary game is not a bonus game since it occurs over the main games.

What is needed is a new technique for triggering a bonus game that creates more excitement while enticing the player to play longer. A more interesting game will generate increased revenue by its increased play.

SUMMARY

Disclosed herein is a secondary game that is played continuously over the course of a series of reel-type main games on a gaming device, where the successful outcome of the secondary game is the initiation of a bonus game. Therefore, the player is enticed to keep playing due to the player's investment in the secondary game and due to the expectation of playing a bonus game at the end of the secondary game. The gaming device may be a video slot machine, a computer performing on-line gaming, a smart phone, or any other portable computing device.

One embodiment of the secondary game is as follows. For simplicity, the main game is assumed to be a 3×3 matrix of virtual reels, although the matrix can have any number of rows and columns. At the beginning of a playing session, a colored tile is located at each of the nine symbol positions and is visible behind any symbol at that symbol position. The virtual reels are then spun and randomly stopped to display nine random symbols at the symbol positions. It is assumed that the pay lines are three horizontal lines across the three rows and two diagonal lines. If there is a winning combination of symbols, such as three of a kind, the player is given an award from a paytable, and the tiles behind those symbols in the winning combination are extinguished. For example, the tiles may be animated to break and fall downward off the screen. There may be multiple winning combinations for a single spin.

The player then bets again and plays the main game again, while the tiles remain from the previous game. Again, any tiles behind the symbols in a winning combination are extinguished.

The player keeps playing the main games until there are no more tiles left behind the symbols. When all tiles are extinguished, a bonus game is triggered. In one embodiment, extinguishing all the tiles awards the player an instant prize prior to the bonus game beginning. The bonus game may be any game. In one embodiment, the bonus game concludes with the player selecting any one of nine tiles in a 3×3 matrix to reveal a hidden award. The hidden award may be a monetary prize or the number of tiles (e.g., 1 to 9) that are to be extinguished during the resetting of the tiles for the next main game. In another embodiment, any type of bonus game may be played with or without player involvement. The bonus game may be very different from the main game, such as a guessing game, or may be a variation of the main game with larger awards or a higher probability of winning. The awards in the bonus game may be proportional to the bet amount used to play the main game.

After the bonus game is over, a new set of tiles is displayed at the symbol positions, and the process starts again.

If the player changes her bet amount from one main game to the next, a different set of tiles, only associated with that bet amount, is displayed. The positions of the tiles associated with each bet amount are stored in a memory, so if the player changes the bet, the tiles displayed the last time the player made the same bet are displayed. The tiles associated with different bets may have different colors. This prevents a player from extinguishing most of the tiles during low bet games, and then raising the bet when it is likely that a bonus game will be triggered.

Accordingly, the player is motivated to keep playing as more and more tiles are extinguished since the bonus game becomes more likely to be triggered.

This secondary game may be easily added to existing games having a main game and a bonus game, since the secondary game does not have to change the bonus game but only triggers it. The secondary game may replace any conventional triggering technique for a bonus game. Therefore, the mathematics involved in adding the secondary game while still remaining profitable is not complex. The bonus game may also be initiated using more traditional methods, in addition to the secondary game, such as by a special outcome of the main game.

If the main game is a larger matrix, such as a 4×5 matrix, the secondary game may be ongoing for a relatively long time due to more tiles required to be extinguished.

Other variations are also described.

The invention may easily be programmed into modern video gaming devices or run on computers connected to the Internet or other networks. Such gaming devices include standalone machines, general purpose computers, tablets or smart phones running a gaming program or connected to a server via the Internet or other network, etc.

BRIEF DESCRIPTION OF THE DRAWINGS

FIGS. 4-9 illustrate the progression of the secondary game over a number of main games.

Elements in the various figures that are the same or similar are labeled with the same numeral.

DETAILED DESCRIPTION

The invention can typically be implemented by installing a software program in most types of modern video gaming machines, general purpose computers, smart phones, servers, or other electronic processing devices.

Figure 1:
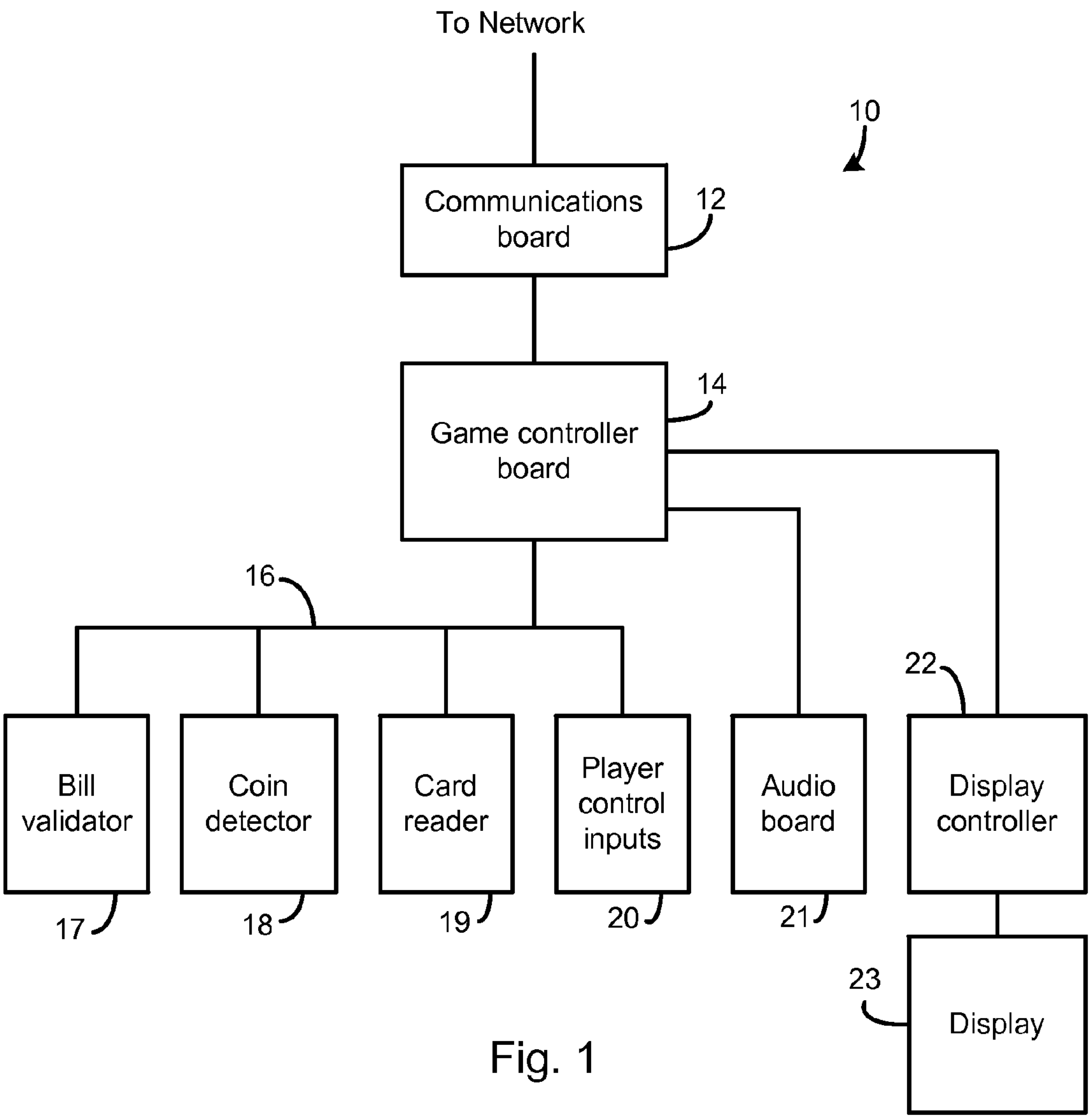
FIG. 1 is a block diagram of certain functional units in a dedicated video slot machine, where the gaming device is programmed to carrying out a game in accordance with the present invention.

The functional units in a conventional video gaming machine 10 are shown in FIG. 1. The gaming machine 10 may be linked to other gaming machines and may include software to carry out the present invention.

A communications board 12 may contain conventional circuitry for coupling the gaming machine 10 to a local area network (LAN) or other type of network (including the Internet) using Ethernet or any other protocol.

A game controller board 14 contains memory and a processor for carrying out programs stored in the memory and for providing the information requested by the network.

The game controller board 14 primarily carries out the game routines of the present invention. A paytable ROM determines the award to the player for achieving a particular winning outcome.

Peripheral devices/boards communicate with the game controller board 14 via a bus 16 using, for example, an RS-232 interface. Such peripherals may include a bill validator 17, a coin detector 18, a smart card reader or other type of card reader 19, and player control inputs 20 (such as buttons or a touch screen). An audio board 21 converts coded signals into analog signals for driving speakers. A display controller 22 converts coded signals to pixel signals for the display 23.

The electronics on the various boards may be combined onto a single board.

Figure 2:
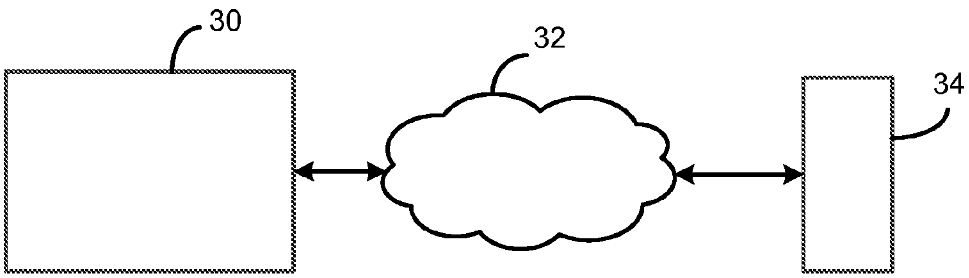
FIG. 2 illustrates a gaming device, such as a general purpose computer, smart phone, or other device running a gaming program or connected to a server via the Internet or other network, that is controlled to display a game in accordance with the present invention.

FIG. 2 illustrates any computing device 30 with a display connected via the Internet 32 or the phone network to a remote server 34, where the server 34 may download a gaming program to the computing device 30 to carry out the present game, or the computing device 30 just displays gaming data generated by the server 34 during the game. The computing device 30 may be a general purpose computer, a smart phone, or other device. Other types of gaming devices are also envisioned.

Figure 3:
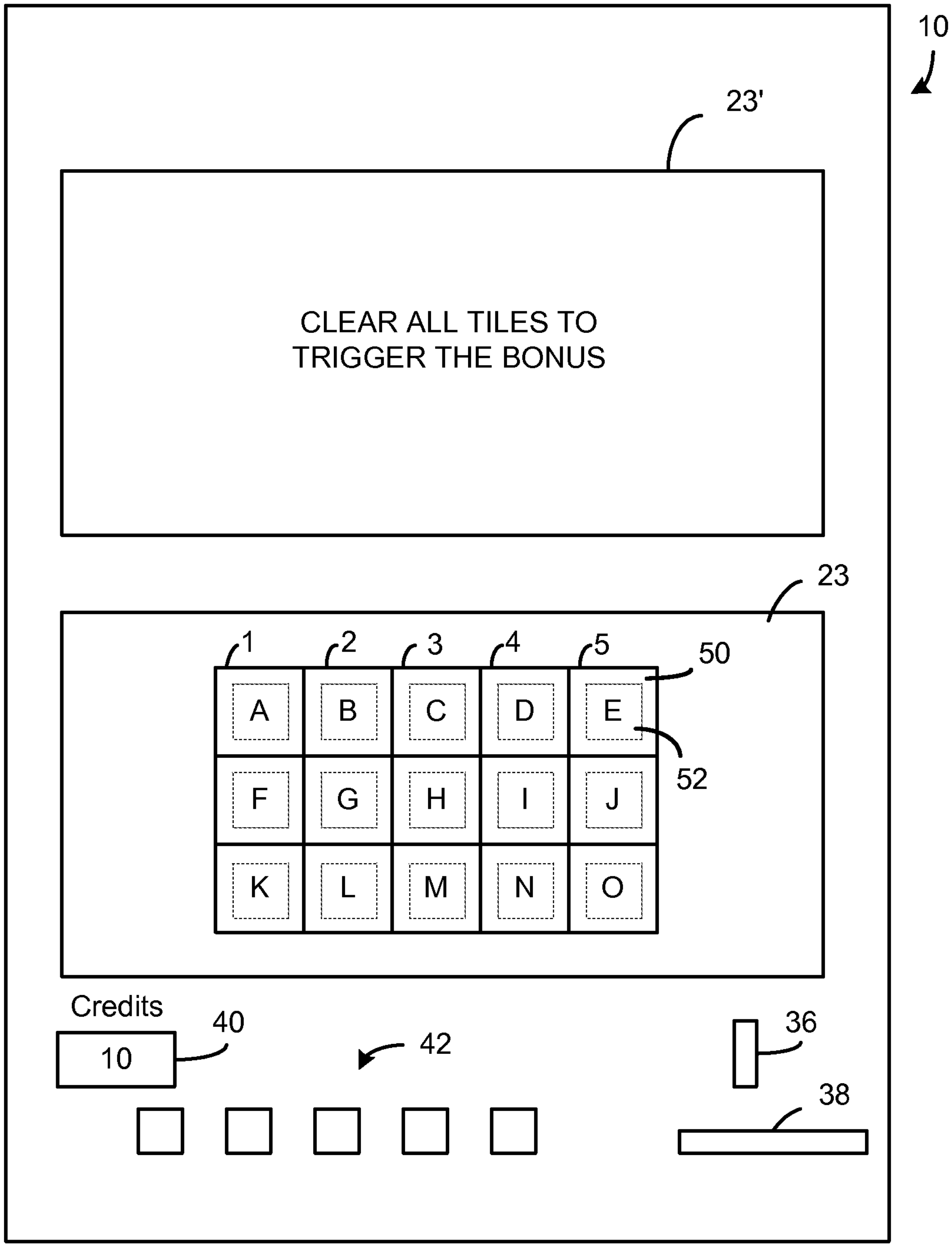
FIG. 3 illustrates more detail of a video gaming device programmed to carry out a game in accordance with the present invention, where the device displays a 3×5 array of symbols with tiles displayed behind the symbols at the start of a playing session.

FIG. 3 illustrates a simplified video gaming machine 10 running the present game. Machine 10 includes a main display 23 that may be a thin film transistor (TFT) display, a liquid crystal display (LCD), a cathode ray tube (CRT), or any other type of display.

An optional second display 23' may provide information, such as an advertisement for the game, the rules of the game, pay tables, pay lines, or other information, or may display a bonus game while the main game and secondary game are displayed on display 23. In one embodiment, displays 23 and 23' have a touch screen feature that enables the player to make selections by touching a displayed icon.

A coin slot 36 accepts coins or tokens in one or more denominations to generate credits within machine 10 for playing games. A slot 38 receives bills or machine readable printed tickets and outputs printed tickets for use in cashless gaming.

A credit meter 40 identifies the current credits in the machine 10.

Player control buttons 42 include any buttons needed for the play of the particular game or games offered by machine 10 including, for example, a bet button, a repeat bet button, a spin reels button, a maximum bet button, a side-bet button, a cash-out button, a display pay lines button, a display payout tables button, select icon buttons, and any other suitable button. A touch screen with virtual buttons may be used instead of physical buttons.

The display 23 shows virtual reels 1-5, displaying a conventional 3×5 array of symbols. There may be an array of 3×3 symbols, an array of 4×5 symbols, or any other arrangement of symbols. Conventional pay lines extend across the five reels. Conventional pay lines include horizontal as well as angled pay lines across all five reels. Sample symbols A-O are shown as the displayed symbols for simplicity. The standard symbol combination game is referred to herein as the main game.

At the beginning of a playing session, such as after a previous player has cashed out and a new player has arrived at the machine 10, the machine 10 may be running an attract mode to display aspects of the game to get players' attention.

When the new player places a bet, a tile 50, associated with that bet amount, is displayed at all the symbol positions. There may be a different color tile 50 associated with each bet amount, such as $0.25, $0.50, $0.75, $1.00, etc. There may also be an initial display of symbols 52 at the symbol positions.

The upper display 23' may include an explanation of the game and payouts to the player, such as "CLEAR ALL TILES TO TRIGGER THE BONUS."

Figure 8:
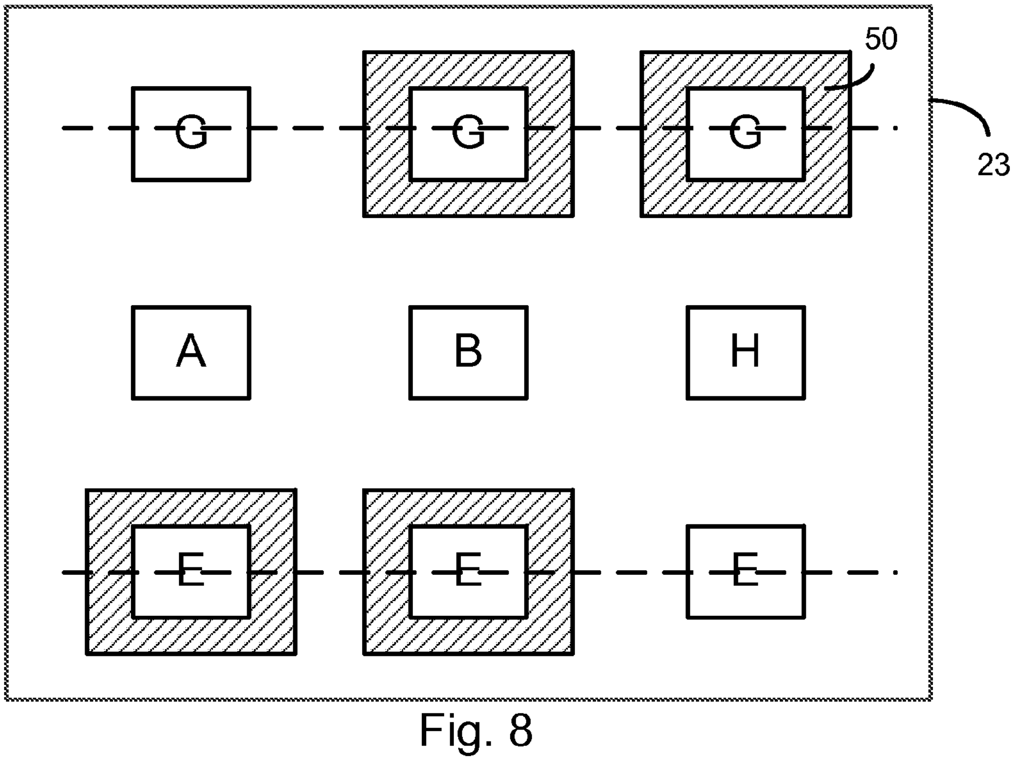
Figure 9:
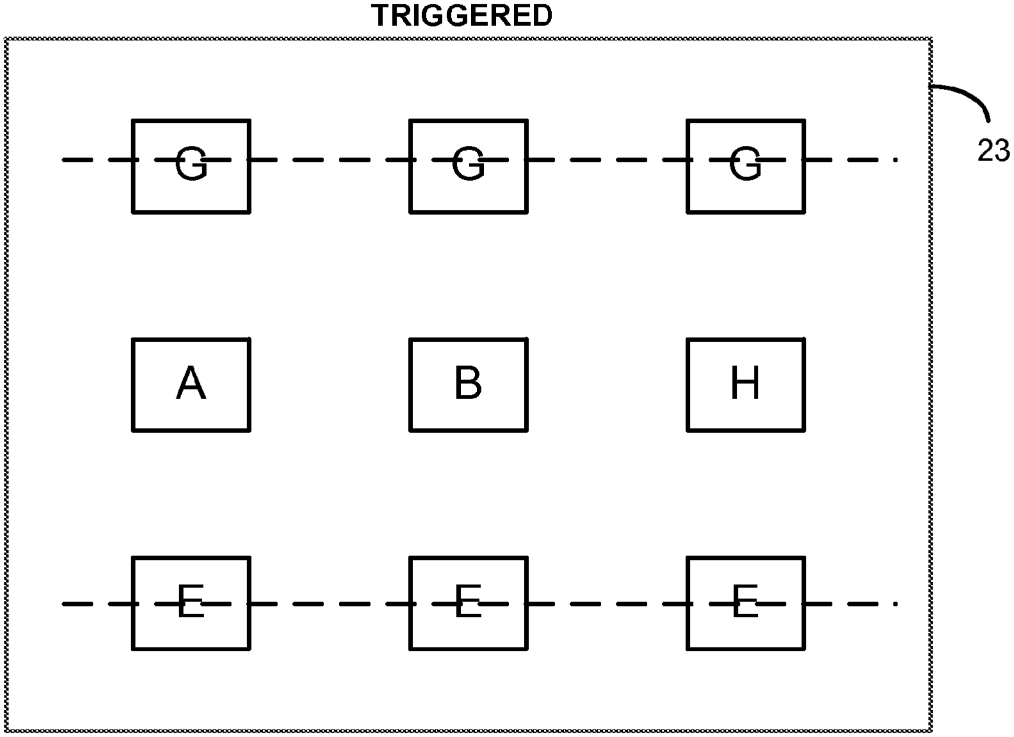
Figure 10:
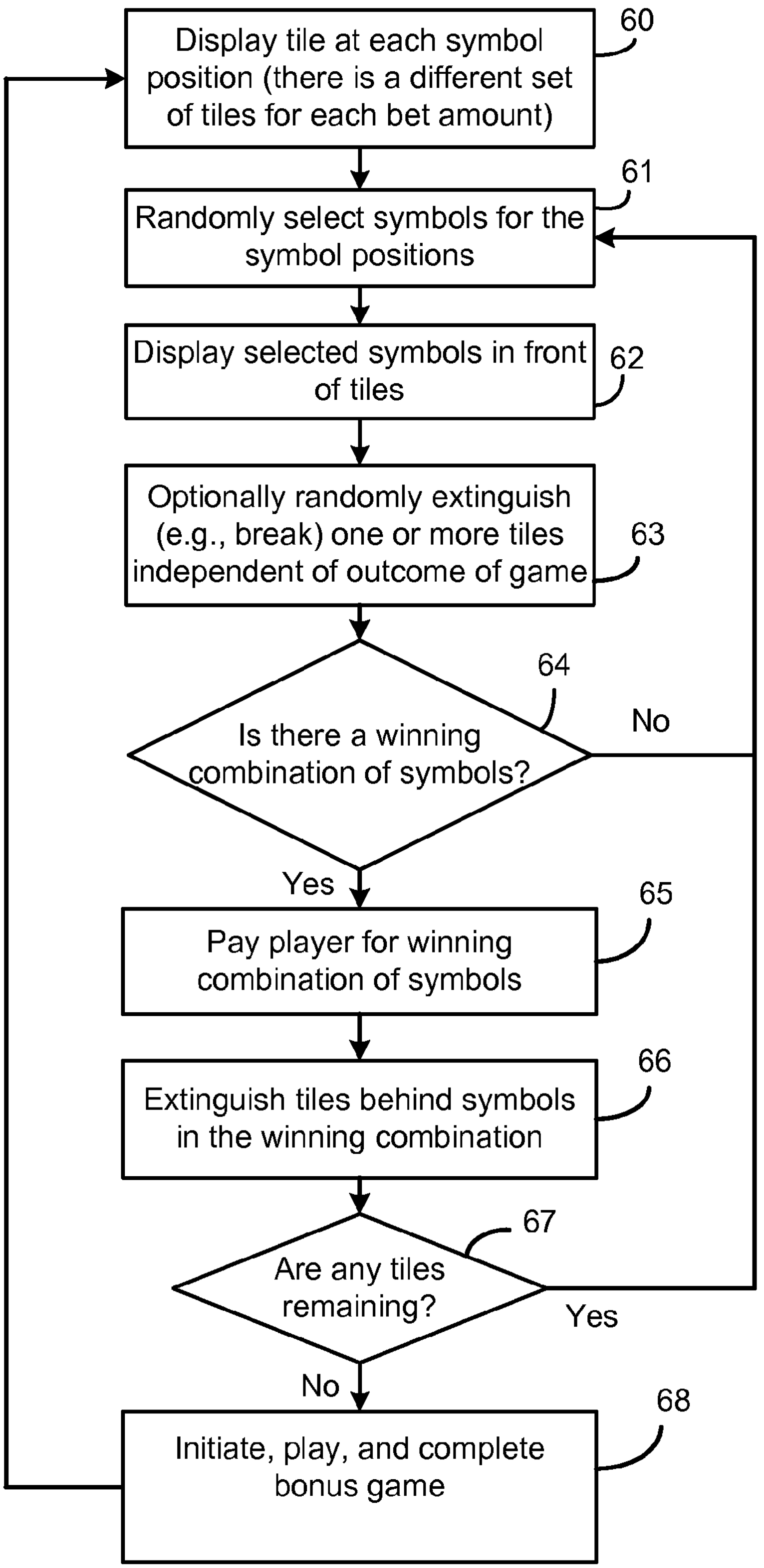
FIG. 10 is a flowchart illustrating steps in one embodiment of the inventive method.

FIGS. 4-9 illustrate a sample progression of main games, using a simplified matrix of 3×3 symbols, as an example of the invention. FIG. 10 is a flowchart that will be referenced in the description.

Figure 4:
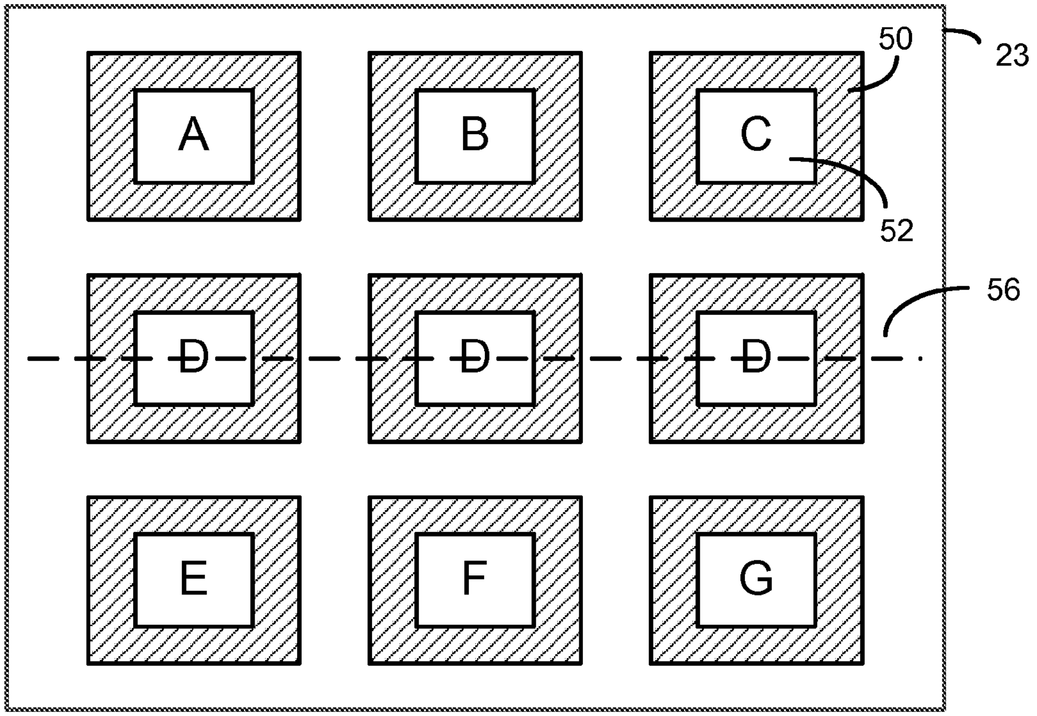
FIGS. 4-9 illustrate a simplified screen display on any form of gaming device carrying out an embodiment of the present invention, where a 3×3 matrix of symbol positions is employed, and where

FIG. 4 illustrates the screen display after a new player bet and played the first main game. All the tiles 50 are initially behind the symbols 52. (Step 60 in FIG. 10.) In another embodiment, the tiles or other visual indicator may surround the symbols 52 or be located anywhere in or near the symbol position so as to be associated with that symbol position. The virtual reels are spun and randomly stopped to display the symbols 52 in front of the tiles 50. (Steps 61 and 62 in FIG. 10.)

In one embodiment, at some random or predetermined time, one or more of the tiles 50 may be randomly extinguished. This may occur before or during the spinning of the virtual reels. (Step 63 of FIG. 10.)

It is assumed that three of the same symbol across a horizontal or diagonal pay line 56 is a winning combination. (Step 64 of FIG. 10.) In FIG. 4, the three D symbols across the center pay line 56 grants the player an instant award, such as 10 credits. (Step 65 of FIG. 10.) All pay lines must be active in the main game to enable all tiles to be eventually extinguished.

Figure 5:
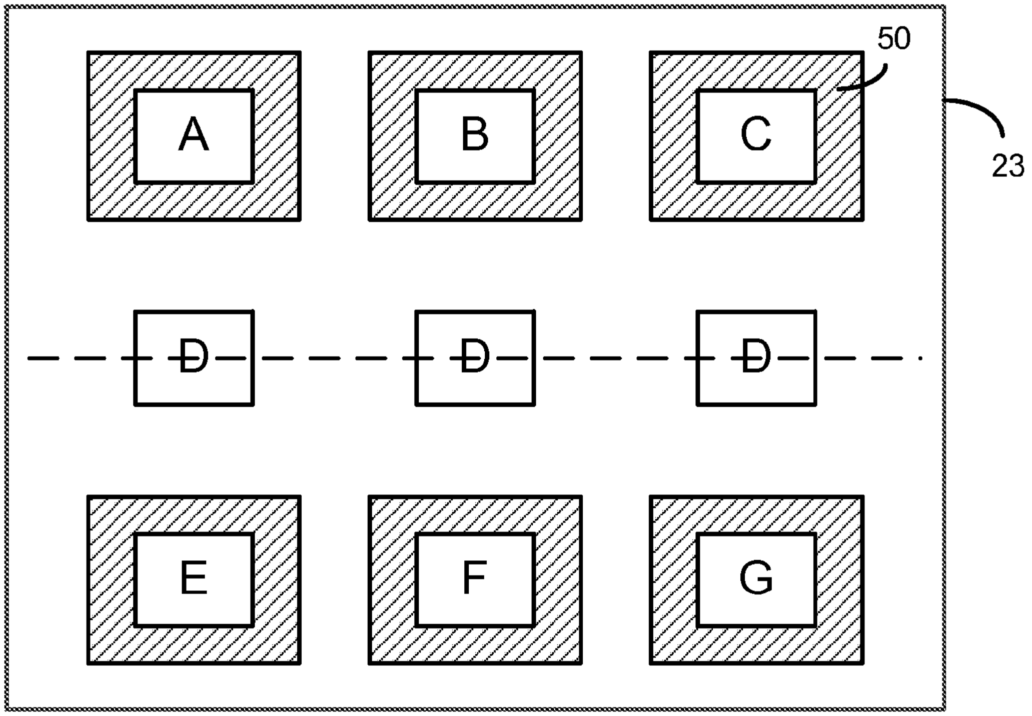

In FIG. 5, prior to or after the instant payout to the player, the three tiles behind the symbols in the winning combination are extinguished. (Step 66 of FIG. 10.) This may be done by changing the colors of the three tiles, animating the shattering of the tiles, and showing the broken tiles falling downward. The tiles may be shattered beginning with the leftmost tile and continuing to the right.

The number of tiles 50 remaining to be extinguished, associated with each bet amount, may be separately displayed to the player, such as on a meter or a totem pole type of display. In this way, the player may be motivated to continue betting the same amount to complete the extinguishing of all tiles associated with that bet amount.

Winning combinations may also include a scatter symbol (a scatter symbol does not have to be on the same pay line as other symbols in a winning combination), so the extinguished tiles after a win need not only be across a single pay line. If special symbols are used, the occurrence of a special symbol may cause the associated tile to be extinguished without that special symbol being part of a winning combination.

Figure 6:
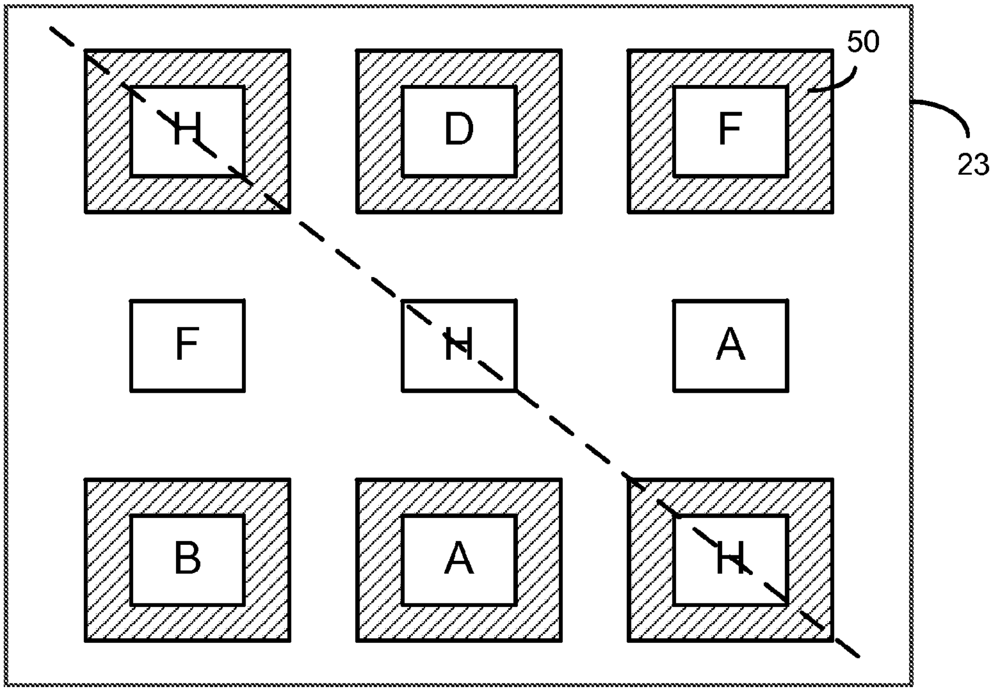

The player then bets and plays another main game, shown in FIG. 6. The tile configuration from the previous game (FIG. 5) is carried over to the next game so that the tile game is a continuous secondary game.

Figure 7:
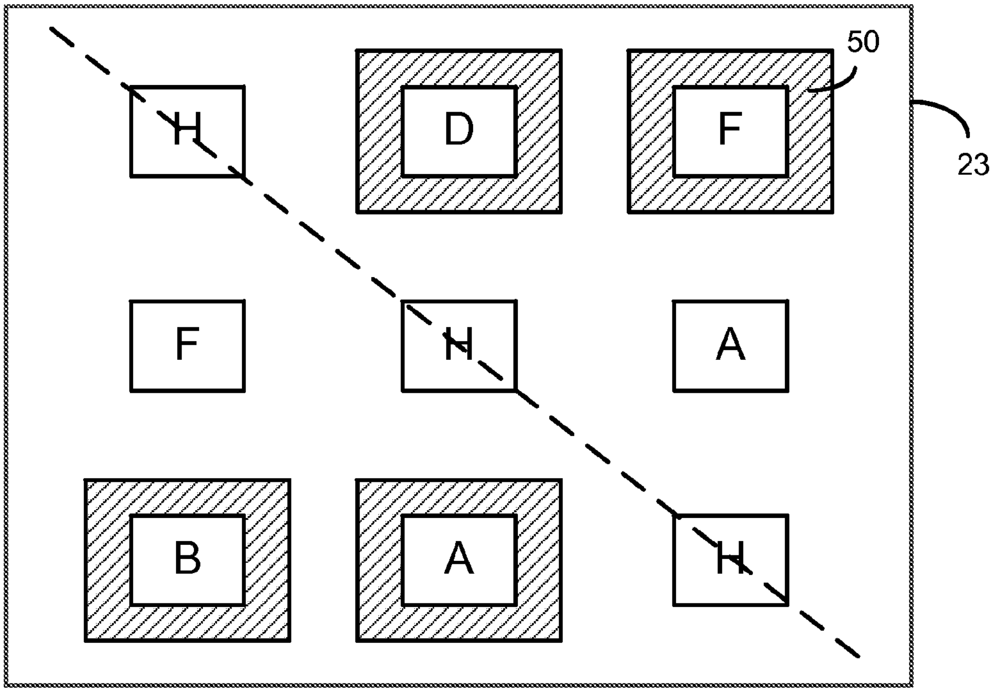

In FIG. 6, the player obtained three H symbols diagonally, so an instant payout is awarded. In FIG. 7, the remaining tiles behind the H symbols in the winning combination are extinguished.

The player bets and plays the next main game in FIG. 8, generating two wins across the upper and lower pay lines, and is awarded an instant payout. In FIG. 9, the tiles behind the symbols in the winning combinations are extinguished, thus causing all tiles on the screen to have been extinguished. (Step 67 of FIG. 10.) This triggers a bonus game, which may be initiated with some fanfare. (Step 68 of FIG. 10.)

In one embodiment, the player wins an instant prize for extinguishing all tiles 50. The bonus game may be any game. In one embodiment, at the end of the bonus game, the player is presented with a screen display where each symbol position has a tile displayed. Behind each tile is a hidden award. The player selects one of the tiles, such as by using a touch screen, and the hidden award is revealed. In another embodiment, the hidden award is the number of tiles (e.g., 1 to 20 for a 4×5 matrix) that will be extinguished during the set up of tiles 50 for the subsequent series of main games.

The bonus game is played for free without any additional bet. The possible awards in the bonus game may be proportional to the bet used to play the main game. For example, the possible awards in the bonus game after playing the main game with a dollar bet are 4 times higher than the possible awards after playing the main game with a quarter bet. In one embodiment, the bonus game routine is unrelated to a reel-type game and will usually involve a fanciful animation having different probabilities of winning different awards, including a progressive jackpot.

The tiles 50 during the main game are associated with a particular bet, such as the tiles being different colors for each bet amount. If the player changes a bet amount from one main game to the next, a new set of tiles is displayed associated with that bet amount. The status of the tiles is stored in a memory, such as in the gaming device or a server, so that if the player changes a bet then goes back to a previous bet, the previous tile status associated with that previous bet will be carried over and displayed. This prevents a player from extinguishing most of the tiles during low bet games, and then raising the bet when it is likely that a bonus game will be triggered.

If the occurrence of all tiles being extinguished is, on average, too frequent, there may be multiple layers of tiles, where the player must extinguish all layers of tiles before the bonus game is triggered. In one embodiment, a tile in a second layer cannot be extinguished until all tiles in the first layer are extinguished. In another embodiment, tiles of any layer may be extinguished as long as a tile in front has been previously extinguished.

After the bonus game is complete, a new set of tiles 50 will repopulate the screen.

In one embodiment, if the player cashes out, the tile statuses (for all bet amounts) will remain so the next player benefits from the previous player leaving partial sets of tiles. Therefore, a player is motivated to not leave an incomplete set of tiles for the next player, and a new player is motivated to begin playing the game if there is an incomplete set of tiles.

In another embodiment, if the player cashes out, all the tile statuses (for all bet amounts) will be reset so the next player starts with a full set of tiles. In another embodiment, if the player uses a player tracking card, the statuses of the tiles may be saved in a central memory when the player cashes out. When the player resumes play at a participating gaming machine using the player tracking card, the statuses of the tiles will be downloaded to the gaming machine so the player can resume where she left off.

Although the term tile has been used to visually identify the status of a symbol position during the secondary game, any visual indication may be used to identify the status of a symbol position, such as a dot, a color, etc. Further, although it is described that a tile is extinguished after the symbol position was part of a winning combination, the tile (or other indicator) may simply change in other ways to indicate that its associated symbol position was part of a winning combination. This may be by changing color, changing shape, or other indication. Still further, although it is described that the tiles initially populate the symbol positions and are then extinguished, the secondary game may add an indicator (e.g., a tile) to a symbol position after its symbol was involved in a winning combination, so that the bonus game is triggered when all symbol positions are populated with a tile or other indicator. Thus, the displayed indicator for a symbol position involved in a winning combination may be the existence of a visual marker or the lack of a visual marker.

Although the term randomly has been used for the selection of symbols and other events, the term randomly may also include pseudo-randomly where the randomness is perceived by the player and essentially unpredictable.

The game may be played on a standalone video gaming machine, on a general purpose computer connected to the Internet, on a smart phone, or using any other type of gaming device. The game may even be played on a social media platform, such as Facebook. In some applications, no monetary award is granted for wins, such as in some on-line games. For playing on social media platforms, non-monetary credits may be used for bets and an award may comprise similar non-monetary credits that can be used for further play or to have access to bonus features of a game. All processing may be performed remotely, such as by a server, while a player interface (computer, smart phone, etc.) displays the game to the player.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a gaming device comprising:

displaying a succession of main games, each main game comprising displaying random selections of symbols in a matrix of symbol positions, wherein there are certain winning combinations of symbols across a plurality of symbol positions;

displaying a secondary game concurrently with the succession of main games, where the secondary game carries over from one main game to the next main game, wherein the secondary game comprises:

providing a visual indicator at a symbol position when a symbol at that symbol position is involved in a winning combination of symbols at the end of a main game;

carrying over all visual indicators from one main game to the next main game; and determining when all symbol positions in the matrix have had a symbol involved in a winning combination, as indicated by each symbol position displaying a visual indicator, and, if so, initiating a bonus game.

2. The method of claim 1 wherein the visual indicator adds an image to a symbol position when a symbol at that symbol position is involved in a winning combination of symbols at the end of the main game.

3. The method of claim 1 wherein the visual indicator subtracts an image from a symbol position when a symbol at that symbol position is involved in a winning combination of symbols at the end of the main game.

4. The method of claim 1 wherein the visual indicator changes an image at a symbol position when a symbol at that symbol position is involved in a winning combination of symbols at the end of the main game.

5. The method of claim 1 wherein the visual indicator is a tile that appears behind a symbol, where the tile is extinguished when a symbol at that symbol position is involved in a winning combination of symbols at the end of the main game.

6. The method of claim 1 wherein there are multiple layers of visual indicators and the bonus game is initiated when all visual indicators in all the layers indicate that all symbol positions in the matrix have had a symbol involved in a winning combination.

7. The method of claim 1 wherein the visual indicators are reset after the bonus game.

8. The method of claim 1 wherein a player may make a plurality of different bets prior to each main game, the secondary game further comprising:

associating different bet amounts with different visual indicators;

using only the visual indicators at the symbol positions during a main game associated with the particular bet amount for that main game;

saving in a memory a status of the visual indicators associated with a previous bet amount when the player changes the bet amount for a new main game; and playing the secondary game with the set of visual indicators associated with the bet amount for the new main game.

9. The method of claim 1 wherein the gaming device is a dedicated video gaming machine.

10. The method of claim 1 wherein the gaming device is a computer connected to a server via a network.

11. The method of claim 1 wherein the gaming device is a computer connected to a server via the Internet.

12. The method of claim 1 wherein the gaming device is a smart phone.

13. The method of claim 1 wherein the gaming device is a portable computing device.

14. A gaming device comprising:

a display screen:

a processing system running a game program to carry out the following method:

displaying a succession of main games, each main game comprising displaying random selections of symbols in a matrix of symbol positions, wherein there are certain winning combinations of symbols across a plurality of symbol positions;

displaying a secondary game concurrently with the succession of main games, where the secondary game carries over from one main game to the next main game, wherein the secondary game comprises:

providing a visual indicator at a symbol position when a symbol at that symbol position is involved in a winning combination of symbols at the end of a main game;

carrying over all visual indicators from one main game to the next main game and determining when all symbol positions in the matrix have had a symbol involved in a winning combination, as indicated by each symbol position displaying a visual indicator, and, if so, initiating a bonus game.

15. The device of claim 14 wherein the visual indicator adds an image to a symbol position when a symbol at that symbol position is involved in a winning combination of symbols at the end of the main game.

16. The device of claim 14 wherein the visual indicator subtracts an image from a symbol position when a symbol at that symbol position is involved in a winning combination of symbols at the end of the main game.

17. The device of claim 14 wherein the visual indicator changes an image at a symbol position when a symbol at that symbol position is involved in a winning combination of symbols at the end of the main game.

18. The device of claim 14 wherein the visual indicator is a tile that appears behind a symbol, where the tile is extinguished when a symbol at that symbol position is involved in a winning combination of symbols at the end of the main game.

19. The device of claim 14 wherein there are multiple layers of visual indicators and the bonus game is initiated when all visual indicators in all the layers indicate that all symbol positions in the matrix have had a symbol involved in a winning combination.

20. The device of claim 14 wherein the visual indicators are reset after the bonus game.

21. The device of claim 14 wherein a player may make a plurality of different bets prior to each main game, the secondary game further comprising:

associating different bet amounts with different visual indicators;

using only the visual indicators during a main game associated with the particular bet amount for that main game;

saving in a memory a status of visual indicators associated with a previous bet amount when the player changes the bet amount for a new main game; and playing the secondary game with the set of visual indicators associated with the bet amount for the new main game.

22. The device of claim 14 wherein the gaming device is a dedicated video gaming machine.

23. The device of claim 14 wherein the gaming device is a computer connected to a server via a network.

24. The device of claim 14 wherein the gaming device is a computer connected to a server via the Internet.

25. The device of claim 14 wherein the gaming device is a smart phone.

26. The device of claim 14 wherein the gaming device is a portable computing device.

* * * * *